United States Patent [19]
Davis

[11] Patent Number: 4,934,318
[45] Date of Patent: Jun. 19, 1990

[54] METHOD OF LAMPREY CONTROL

[76] Inventor: William A. Davis, Sand Bay Resort, R. R. #1, Nobel, Ontario, Canada, P0G 1G0

[21] Appl. No.: 308,053

[22] Filed: Feb. 9, 1989

[51] Int. Cl.⁵ ............................................. A01K 61/00
[52] U.S. Cl. ........................................................ 119/3
[58] Field of Search ...................... 119/3, 4, 1; 43/124

[56] References Cited

U.S. PATENT DOCUMENTS

| | | | |
|---|---|---|---|
| 2,955,569 | 10/1960 | Oahlin | 119/3 |
| 4,395,969 | 8/1983 | Cheng et al. | 119/3 |
| 4,594,965 | 6/1986 | Asher | 119/3 |

FOREIGN PATENT DOCUMENTS 1355200 11/1987 U.S.S.R. ................................ 119/3

OTHER PUBLICATIONS

The encyclopedia of Marine Resources, "Sea Lamprey", pp. 612-616, pub. 1969.

*Primary Examiner*—John Weiss
*Attorney, Agent, or Firm*—Smart & Biggar

[57] ABSTRACT

A method of controlling the population of sea lamprey wherein a suitable treatment site is chosen and rocks of a sufficient size and concentration are then introduced to the floor of the watercourse to create an inhospitable environment for spawning lamprey. Various means of locating appropriate treatment sites and carrying out the treatment of the site chosen are described.

10 Claims, 3 Drawing Sheets

METHOD OF LAMPREY CONTROL

FIELD OF THE INVENTION

This invention relates to a method of controlling the population of sea lamprey. In particular, this invention relates to a method of destroying the spawning habits of the lamprey by modifying the spawning habitat.

BACKGROUND OF THE INVENTION

The sea lamprey (*Petromyzone marinus*) is the only modern survivor of an ancient family of "jawless" fishes that dates back almost 250 million years. These eel-like creatures were originally a salt water ocean fish, migrating into fresh water streams only to spawn. However, when in the early 1900's the United States and Canadian Great Lakes (Lakes Superior, Michigan, Huron, Erie and Ontario) were made accessible to the Atlantic Ocean by way of man-made canals, sea lampreys migrated into each of the lakes over a course of years, eventually completley their full life cycle in fresh water.

In the adult phase of the life cycle, the lamprey has an eel-like body with a large downward-slanting mouth at one end. The mouth is equipped with sucking discs with which the lamprey attaches to prey, usually other fish such as salmon and perch, and feeds on blood and other body tissue. The sea lamprey has, for many years now, been a source of major concern for those involved in the Great Lakes fishery. Due, at least in part, to the lamprey invasion, the fish harvest in the Great Lakes declined drastically in the first half of the 1900's.

Various methods of lamprey control have been employed with varying degrees of success. One of those methods involved erecting barriers to deny the lamprey access to spawning areas. That method proved to be costly to build and maintian and also commonly proved ineffective when lampreys found alternate spawning areas.

A further method involved adding an electrical current to the barriers to shock the lampreys when they approached. This method also had disadvantages in that it was expensive to operate, to a large degree inefective and sometimes had the undesirable effect of killing other fish.

The main method of lamprey control that has met with some success is through the release of chemicals containing a compound specifically deadly to lamprey larvae into the water systems. While this method has proved to be more effective than those discussed above, there are continuing concerns about the introduction of foreign chemicals into the water sytems. Certain other fish and insect species have been affected. Also, chemical treatment has been less than 100% effective. Lamprey numbers continue to be a concern in each of the Great Lakes and in many of the connecting rivers and streams.

The present invention has several advantages over the prior methods described above. The method is simple and will be effective is strongly curtailing if not eliminating lamprey numbers where it is practised. The method will be relatively inexpensive as very little ongoing maintenance will be required. The method of this invention will also involve no use of chemicals or the introduction of any other foreign matter into the water system.

SUMMARY OF THE INVENTION

According to one aspect of the present invention, there is provided a method of controlling the population of the sea lamprey at a predetermined site on a watercourse which has exposed areas of its floor which are suitable for lamprey nesting purposes comprising: distributing a plurality of rocks across the site to form a covering of rocks which is sufficiently concentrated to reduce the size of the exposed areas to a size will inhibit lamprey nesting, substantially all of the rocks of the covering being of a size which is too great to be utilized by the lamprey in the formation of its nest.

According to another aspect of the present invention, there is provided a method of controlling the population of the sea lamprey comprising the steps of determining whether an area in question is an appropriate treatment site by viewing the floor of the watercourse to assess the substrate to determine its suitability for lamprey spawning and, introducing rocks to the floor of the watercourse so that a covering of rocks that are of a weight of at least 0.7 kg and of a size such that they cannot be passed through a screen with openings measuring 4"×4" but will pass through a screen with openings measuring 17"×17" is created wherein the concentration of the rocks in the covering is such that the uncovered areas are of a size which is no greater than 4"×4".

BRIEF DESCRIPTION OF THE DRAWINGS

In drawings which illustrate embodiments of the invention.

DESCRIPTION OF THE PREFERRED EMBODIMENT

Figure 1:
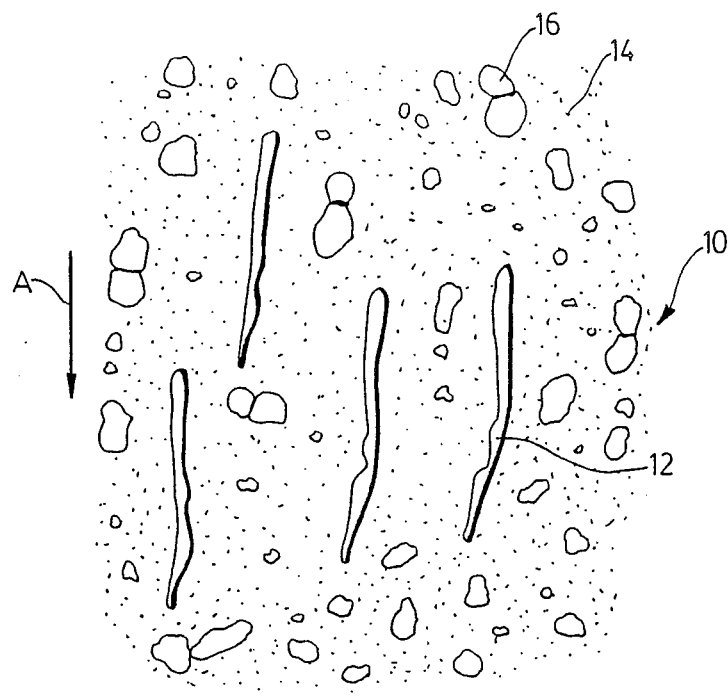
FIG. 1 is a plan view of a portion of a stream which illustrates a suitable substrate for a spawning.
Figure 2:
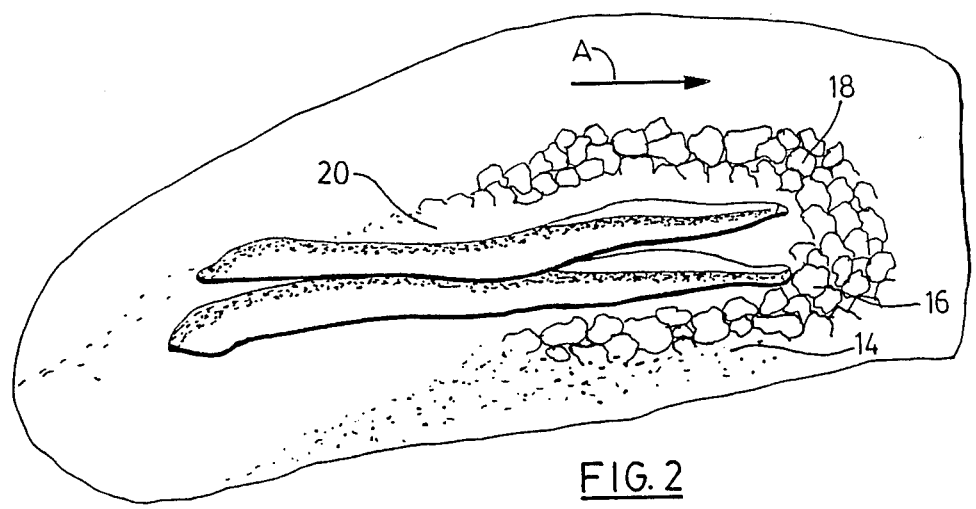
FIG. 2 is a pictorial view of a typical lamprey nest and spawning lamprey.

The typical spawning habitat sought by the sea lamprey is illustrated in FIG. 1 and is generally identified by the reference numeral 10. The lamprey 12 requires a fresh water watercourse with a uni-directional current indicated by arrow A. In addition, a substrate having gravel 14 or small rocks 16 preferably less than 2" in diameter is required. The arrangement of the substrate to form a nest 18 is illustrated in FIG. 2. Gravel 14 or small rock 16 is formed in a semi-circular arrangement. The semi-circular nest 18 has an opening 20 which opens in the direction of the water flow.

Figure 3:
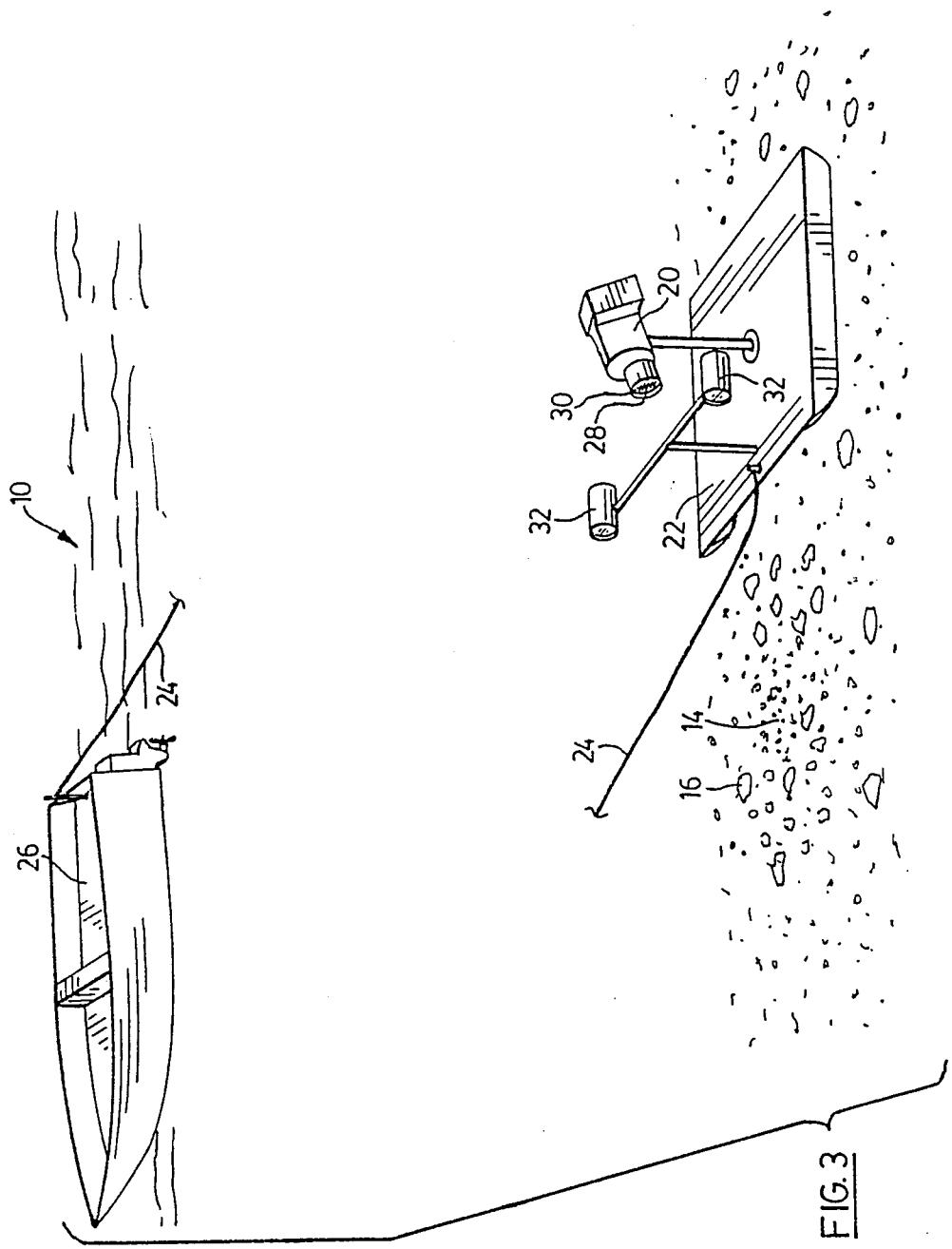
FIG. 3 is a diagramatic illustration of an apparatus which may be used to film the waterbed to locate spawning sites which should be treated in accordance with this method.

FIG. 3 illustrates a method of determining whether a particular watercourse is suitable for treatment by this method. An appropriate watercourse would be one in which the uni-directional current indicated by arrow A in FIGS. 1 and 2 and small gravel 14 or rock 16 substrate are present prior to treatment. In order to view the substrate of a particular watercourse, a waterproof video camera 20 is mounted on a weighted under-water sled 22 attached by means of a tether 24 to a vessel 26 and towed along the floor of the watercourse. The video camera 20 is provided with a scale 28 mounted within view of the lens 30 so as to appear as part of the video film whereby the size of the rock 16 or gravel 14 on the floor of the waterway can be determined as the film is viewed. Lights 32 are mounted on the sled 22 to improve visibility as the sled 22 moves through the water. Those skilled in this field will appreciate that it probably would not be necessary to cover every portion of a given watercourse with the video camera 20 in order to make an assessment as to its suitability for treatment. Various transects can be chosen, the video camera 20 towed through those areas and the film later viewed for assessment of the waterbed for treatment. Alternatively, the image taken by the video camera could be viewed immediately by means of a monitor transported in the vessel. In that case, the sled 22 could be so equipped as to be directionally controlled form the vessel so that its position could be altered by an operator in response to information as it is received through the monitor of the video camera.

As an alternative or a supplement to the method of survey shown in FIG. 3, human divers may be used to view the bottom of the watercourse directly.

Methods of equipping various fish species with radio transmitters in order to locate spawning sites are known. Similarly, as a further alternative or supplement to the methods already described, suitable treatment sites for the practice of this method could be located by attaching such devices to adult lamprey to locate areas where spawning is actually taking place. Other alternatives will be apparent to those skilled in the art.

Figure 4:
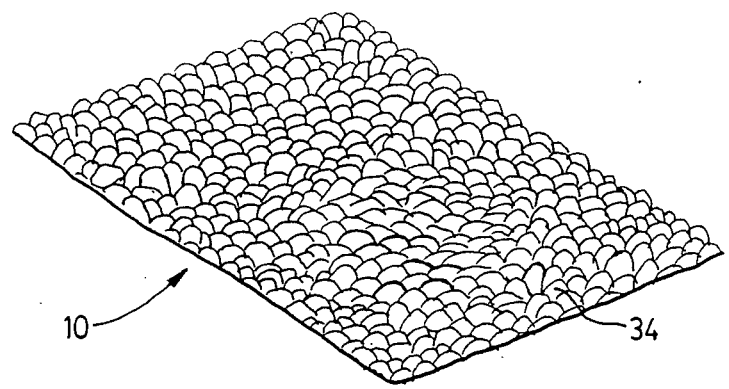
FIG. 4 is a pictorial view of a portion of a watercourse wherein rocks have been placed to modify the spawning site to make it unsuitable for spawning in accordance with this invention.

FIG. 4 illustrates a watercourse that has been treated according to the method of this invention. Large rocks 34 of a sufficient size such that they will not pass through screen with an opening of less than 4"×4" cover the floor of the watercourse thus covering the gravel or smaller rock that would have been used by the lamprey as nesting material. The rocks are placed in close or over-lapping relationship such that no exposed areas of a size greater than 4"×4" are present such as would allow a lamprey enough space to create a nest in the area between rocks.

Figure 5:
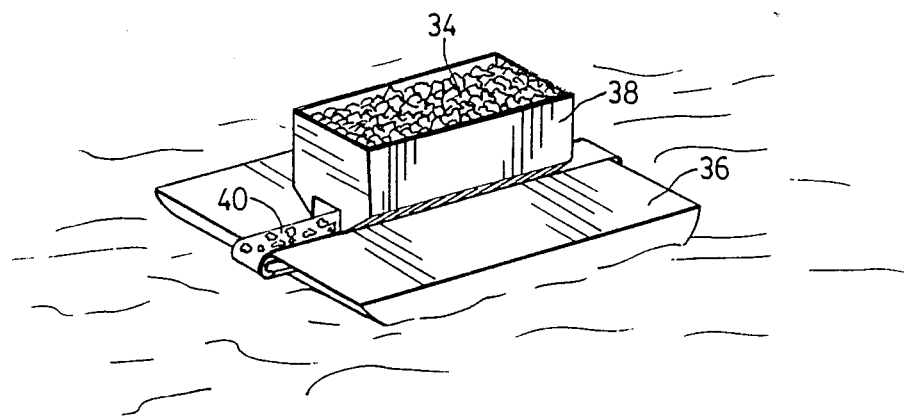
FIG. 5 shows a method of introducing suitable rock to the watercourse to be treated.

FIG. 5 shows a method of treatment of a watercourse in accordance with this invention. A barge 36 is equipped with a rock carrying hopper 38 which transports appropriately sized rocks 34. A conveyor 40 moves the rocks 34 from the bottom of the hopper 38 to the edge of the barge 36 where they are released into the water. The proper placement of the rocks will be determined through viewing the video film of the substrate in conjunction with the observations of the divers. It will be understood that the movement of the rocks along the conveyor and release into the water must be timed such that an appropriate covering of the substrate is achieved, taking into consideration various factors such as the rate and direction of the water current, the size and weight of the rock, the speed of the conveyor and the speed at which the barge travels.

I claim:

1. A method of controlling the population of the sea lamprey at a predetermined site on a watercourse which has exposed areas of its floor which are suitable for lamprey nesting purposes comprising: distributing a plurality of rocks across the site to form a covering of rocks which is sufficiently concentrated to reduce the size of the exposed areas to a size will inhibit lamprey nesting, substantially all of the rocks of the covering being of a size which is too great to be utilized by the lamprey in the formation of its nest.

2. The method of claim 1 wherein the concentration of the rocks in the covering is such that the exposed areas are reduced to a size which is no greater than 4"×4".

3. The method of claims 1 or 2 wherein substantially all of the rocks that are distributed are of a sufficient size such that they cannot be passed through a screen with openings measuring 4"×4" but will pass through a screen with openings measuring 17"×17".

4. The method of claim 3 wherein substantially all of the rocks that are distributed are of a weight of at least 0.7 kg and therefore cannot be employed by the lamprey in the formation of its nest.

5. The method of claims 1, 2 or 3 wherein the determination of whether the area is an appropriate treatment site is made by towing a viewing device along the floor of the watercourse.

6. The method of claim 5 wherein the viewing is carried out by means of an underwater video camera which is used to produce images of the floor of the watercourse.

7. The method of claim 6 comprising the step of superimposing a scale on the images produced by the video camera thus allowing for measurement of matter appearing on the floor of the watercourse.

8. The method of claims 6 or 7 wherein the video camera is affixed to a platform which is capable of being towed along the floor of the watercourse.

9. The method of claims 1, 2 or 4 wherein the rocks are transported to the site to be treated in a floating vessel and conveyor means are employed to convey to rocks from the vessel to the water.

10. A method of controlling the population of sea lamprey comprising the steps of:
    (a) determining whether an area in question is an appropriate treatment site by viewing the floor of the watercourse to assess the substrate to determine its suitability for lamprey spawning; and,
    (b) introducing rocks to the floor of the watercourse so that a covering of rocks that are of a weight of at least 0.7 kg and of a size such that they cannot be passed through a screen with openings measuring 4"×4" but will pass through a screen with openings measuring 17"×17" is created wherein the concentration of the rocks in the covering is such that the uncovered areas are of a size which is no greater than 4"×4".

* * * * *